US004001562B2

United States Statutory Invention Registration [19]

[11] Reg. Number: H1562

Albrechcinski et al.

[45] Published: Jul. 2, 1996

[54] HEAT SENSITIVE LIQUID CHEMICAL AGENT AND PESTICIDE DETECTOR AND METHOD OF USING

[75] Inventors: Thomas M. Albrechcinski, Cheektowaga; Charles K. Akers, Williamsville, both of N.Y.

[73] Assignee: The United States of America as represented by the Secretary of the Army, Washington, D.C.

[21] Appl. No.: 10,719

[22] Filed: Jan. 29, 1993

Related U.S. Application Data

[63] Continuation of Ser. No. 866,774, Apr. 3, 1992, abandoned.

[51] Int. Cl.[6] ..... G01N 27/00

[52] U.S. Cl. ..... 422/98; 422/82.02; 422/82.12; 422/94; 422/97; 436/147; 436/150; 436/151

[58] Field of Search ..... 422/98, 94, 97, 422/82.01, 82.02, 82.12; 436/147, 150, 151, 163

[56] References Cited

U.S. PATENT DOCUMENTS

| | | | |
|---|---|---|---|
| 4,125,374 | 11/1978 | Bode et al. | 422/98 |
| 4,839,700 | 6/1989 | Ramesham et al. | 361/500 |
| 5,003,812 | 4/1991 | Yagawara et al. | 422/98 |

*Primary Examiner*—Donald P. Walsh

*Assistant Examiner*—Chrisman D. Carroll

*Attorney, Agent, or Firm*—Anthony T. Lane; Edward Goldberg; Michael Sachs

[57] ABSTRACT

The device of this invention is used to detect small quantities of liquid chemical agents in certain pesticides on the basis of the heat reaction between the liquid agent and a chemical oxidant such as sodium or calcium hypochlorite. The detecting device consists of a thin film of resistance heat sensitive element on top of which porous or fibrous substrate material is mounted. This substrate is impregnated with the oxidant material. As a liquid agent contacts substrate it permeates through the substrate and reacts with the oxidant and generates heat. The output volume from the thin film resistance element increases correspondingly. The time from agent contact until this signal is observed as tested is less than one (1) second. The method is directed to the contacting of the liquid agent against the surface, wherein it permeates through the substrate and reacts with the oxidant and generates heat which change in heat is detected by the detecting device.

4 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

HEAT SENSITIVE LIQUID CHEMICAL AGENT AND PESTICIDE DETECTOR AND METHOD OF USING

GOVERNMENT INTEREST

The U.S. Government has rights in this invention pursuant to contract number DAAK11-82-C-0063 awarded by the Department of the Army.

This application is a continuation, of application Ser. No. 07/866,774, filed Apr. 3, 1992, now abandoned.

BACKGROUND AND SUMMARY OF THE INVENTION

This invention relates to detector devices, and more particularly to a heat sensitive liquid chemical agent and pesticide detector and the method of using the same.

PRIOR ART DISCUSSION OF INVENTION AND USE

This invention is directed to an agent detector for use by military personnel in the field. The device can be portable but also could be scaled up and used as a fixed site device as well. The sensing surface could be made as small as 0.040" dia. or as large as desired by assembling individual detector units in a mosaic type arrangement. Prior art detectors utilize a device which is electrically conductive and the agents react with resins impregnated with silver flakes, swelling the resin, and thereby breaking an electrical circuit.

The term agent as herein used is a liquid agent, such as nerve agents many of which are classed as organo-phosphates. Many insecticides such as "Malathion" are also organo-phosphates There currently is a need to be able to detect the presence of these agents in the field, to protect personnel from the dangers of being exposed.

A means of detection for such agents must be very responsive and reliable when challenged by very small quantities of agent, i.e., droplets less than hundreds of microns in diameter or in terms of volume, in quantities less than a microliter.

In battlefield environments, other materials will also be present in liquid, gaseous form. The device needs to be insensitive to these other materials and hereinafter to be called interferents.

Examples of interferents could be oils, other fuels, chemicals, rain, etc. The device of the instant invention is relatively insensitive to interferents.

The aspects of this invention related to two different conditions. The first is that agents are decontaminated chemically by using materials such as calcium hypochlorite, such as in a swimming pool (HTH), chlorine, bleach, etc, and that during a reaction which is an exothermic reaction, heat is released.

The detector of the invention is utilized to detect this minute increase in temperature, resulting from the exothermic reaction with a detector utilizing a thin film heat transfer gauge or detector. Such devices exist in the prior art and are often used in aerodynamic testing, in high speed wind tunnels, and to measure heat loads on aircraft models.

The gauge or detector of the instant invention comprises a substrate, such for example "pyrex" or other suitable non-conductive material upon which a thin platinum film electrode pattern is painted. The platinum film may also be vapor deposited in a grid like pattern or any pattern optimized for the detection of liquid droplets depending upon individual requirements.

The thickness of the platinum layer may be in the range of 1000 A degrees thick. Magnesium fluoride is vapor deposited over the gauge to protect the platinum layer from physical abrasion. A low constant current less than four (4) milliamps is passed through the gauge and used and connected to an indicating means with character known in the art, such when the element is exposed to changes in temperature i.e., heating or cooling, the resistance in the platinum film changes and this minute change in temperature is sensed as a change in voltage.

The combination and utilization of these two physical phenomena wherein when agents are decontaminated chemically to produce an exothermic reaction and the concurrent measurement of the minute change in thermal condition of the reactant material provides a means for detection in the field to determine the presence, for example, of nerve agents on classes of pesticides.

This detection is accomplished by use of an oxidizing material wherein the presence of the liquid agents when subjected to such oxidizing material renders it possible to thermally monitor the heat change and more particularly by the use of the film heat transfer gauge of the invention.

By virtue of the high sensitivity of a thin film gauge which provides sensitivity down to tenths of a BTU/ft$^2$-sec (BTU per foot squared second). The system responds to very small quantities of agents, i.e., less than 1 microliter (1 μl). This type of device is operable over a broad range of ambient temperatures since the sensitive element responds to temperature changes relative to the ambient temperature.

OBJECTS OF THE INVENTION

It is an object of this invention to provide a method and apparatus for detecting the presence of liquid nerve agents or other classes or organic phosphate materials including insecticides providing all of the advantages of systems heretofore in general use yet providing increased sensitivity thereover.

One object of the instant invention resides in a method of detecting the presence of liquid agents by producing a chemical reaction which not only provides a thermal change suitable for detection of the presence of the agent when used with the sensor of the device, but also has the potential to decontaminate the agent droplet depending on quantity.

Another object of the invention is to provide a new detecting device for thermal heat of low magnitude suitable for use in a detection system which may be used by personnel in the field to detect presence of nerve gases or the presence of heat during the reaction of any two or more chemicals or materials which are brought together and release heat during the reaction.

Another object of the invention is to provide a detecting system using (HTH) or other suitable oxidizing agents as a decontaminate for the liquid agent which thereby provides the additional benefit of neutralizing the agent herein described.

Another object of the invention resides in the provision of a detection system which reacts in a minimal period of time. The time for agent contact until the signal is observed is less than one second.

The device is also capable of detecting multiple challenges i.e., repeat firings so long as the agent challenge contacts active oxidizing material.

BRIEF DESCRIPTION OF THE DRAWINGS

Other objects and many of the attendant advantages of this invention will be apparent or made more clear by the following description when taken with the accompanying drawings.

FIG. 1 is a plan view of a detector and FIG. 2 is a cross-section of FIG. 1 taken along the cutting plane of FIG. 2—2;

DESCRIPTION OF THE PREFERRED EMBODIMENTS

The configuration illustrated has the potential to be changed in size and scale. What is critical to the detector concept is the deposition of a thin layer (or substrate) of oxidizing material in intimate formal contact with the thin film gauge.

Figure 1:
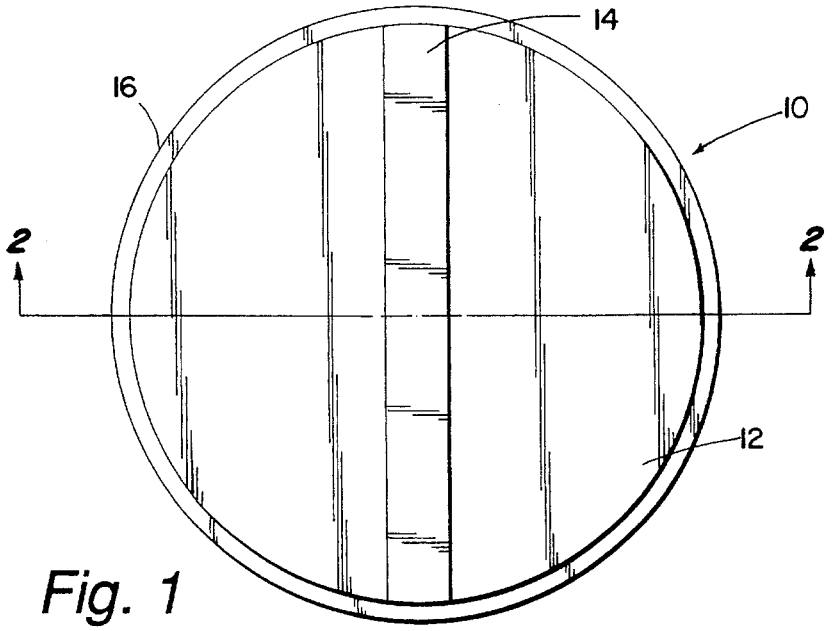
Fig. 1 (PRIOR ART)
FIG. 1 and FIG. 2 are directed to a sensing device of the prior art.
Figure 2:
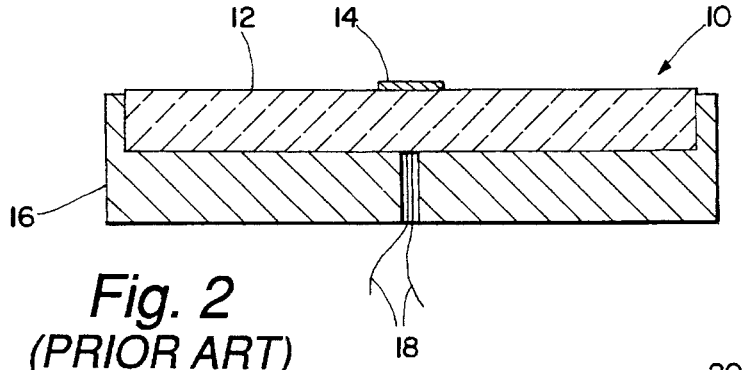
Fig. 2 (PRIOR ART)

Referring now to the detector 10 of FIGS. 1 and 2, there is shown the detector 10 generally with the substrate on which the electrode is disposed indicated at 12 and the electrode which is disposed a cross a diameter of the substrate as shown at 14.

A mounting base which retains the substrate 10 is indicated at 16 and is provided with a hole therein through which leads may be brought out as indicated at 18 for connection to external circuits. The hole may be disposed at any convenient location and is not shown on FIG. 1.

Figure 3:
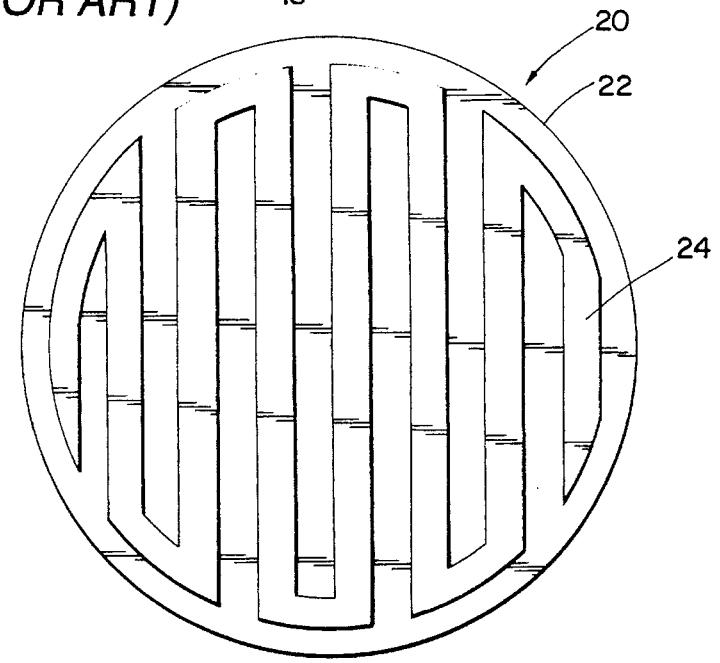
FIG. 3 is a plan view of the preferred embodiment of an electroding pattern for the surface of the detecting element.
Figure 4:
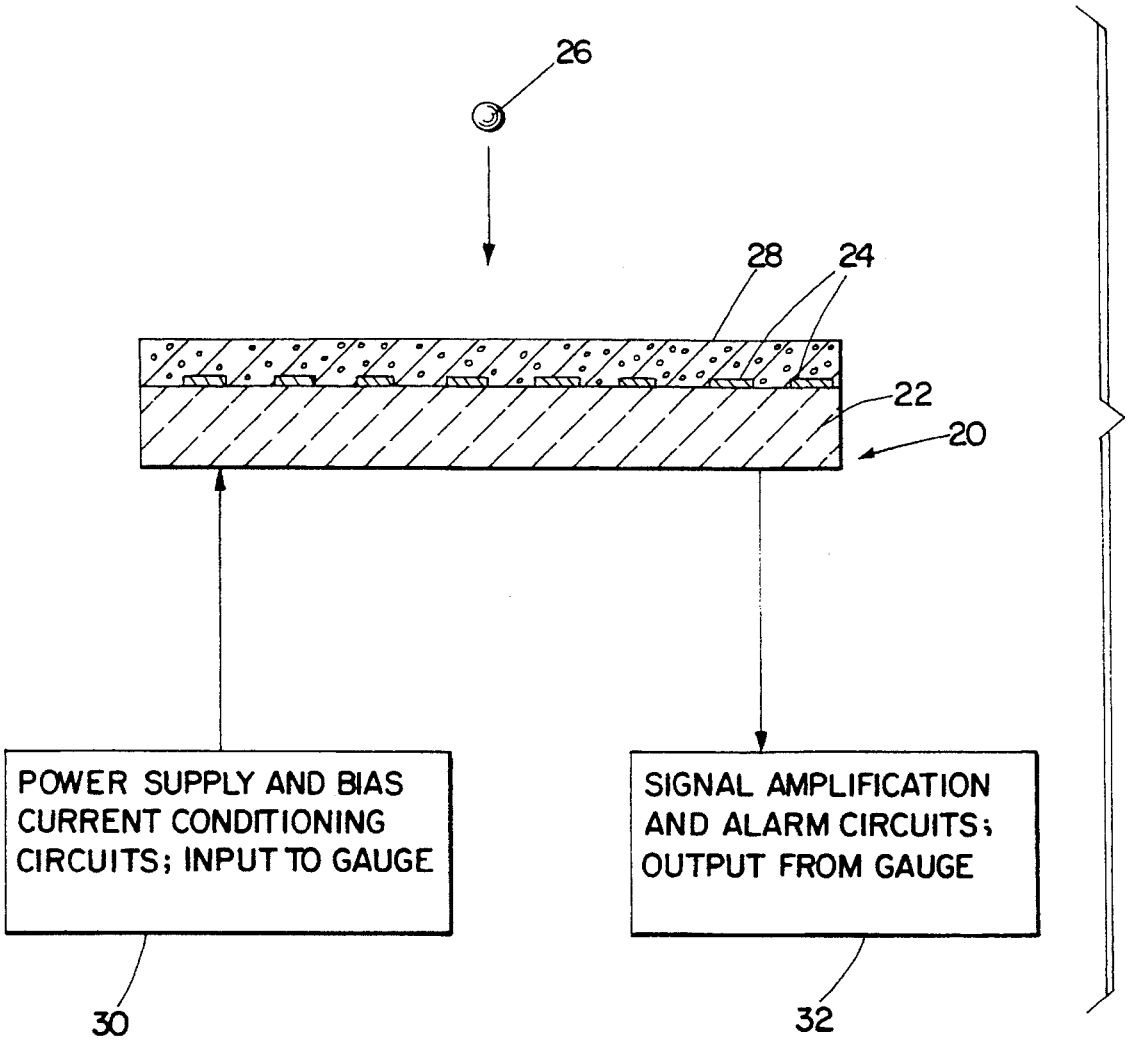
FIG. 4 is a diagrammatic view with the detector element of FIG. 3 disposed on the upper surface of the substrate, with the detector being shown in cross-section and the equipment used with the detector being shown in diagram form.

Referring now to FIGS. 3 and 4, the detector of the instant invention is indicated generally at 20 and comprises a substrate 22 upon which the electrode pattern 24 is coated or suitably applied to the upper surface thereof.

As indicated, the upper surface of the electrode pattern 24 is covered by a porous or foam-like cover into which the oxidizing material is absorbed or otherwise made available for reaction with the droplet as indicated at 26 of the agent. Materials or thin substrates other than foam may also be suitable. The liquid droplet 26 of the agent or organophosphate pesticide contacts the substrate and reacts with oxidant. An electrical resistance film grid 28 is provided in the detector 20 as shown in FIG. 4.

Referring more particularly to FIG. 4, the block diagram 30 indicates a power supply source and bias current conditioning circuits which are applied in a manner well known in the art to the electrodes at surface 24 as an input to the gauge.

As block diagram 32 indicates generally, a output signal of the detector 20 which is a change in voltage is processed by the signal amplification and alarm circuit or other indicating devices 32 as is well known in the art, and is considered a suitable signal for this application.

Figure 5:
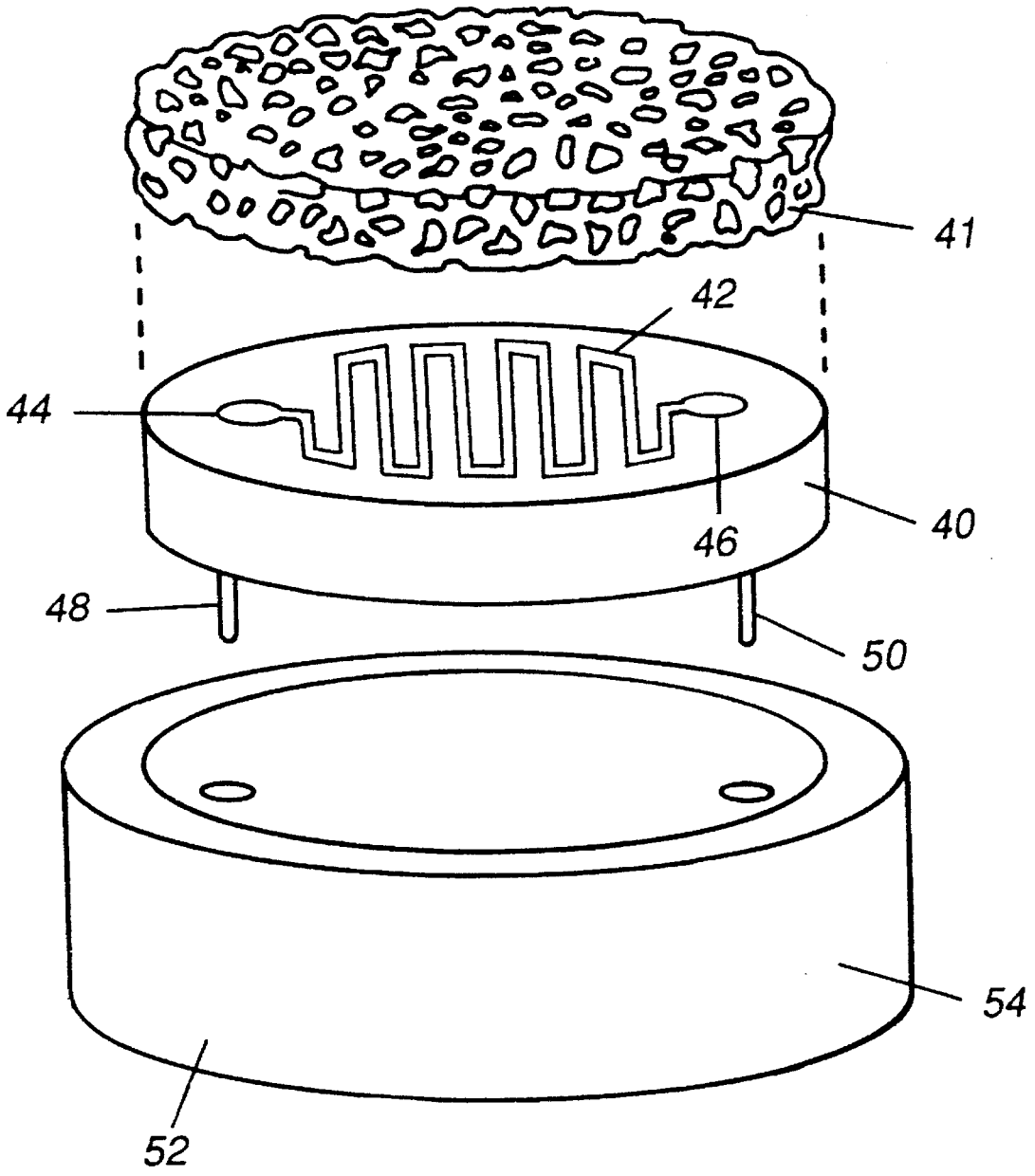
FIG. 5 is an exploded view of another embodiment of the invention which is shown in isometric projection.

FIG. 5 shows a primary functional components of the liquid agent heat sensor according to this invention.

FIG. 5 shows the arrangement of an oxidizer 41 in porous substrate, a thermal sensitive element 40 having a somewhat squarewave pattern 42 theron with the terminal ends 44 and 46 being brought out to leads 48 and 50 which are carried through the base 52 of sensor housing 54 for connection as described in relation to FIG. 4.

The method aspects of the invention are directed to the concept of detecting an agent by chemically reacting with the agent by using materials such as calcium hypochlorite which is swimming pool HTH chlorine, bleach, etc., as herein set forth and during that reaction, subjecting the agent as decontaminated to the surface of the sensing device and obtaining a readout thereof which is indicative of the presence of one or more of the agents in the liquid drop.

In one test of this detector, a quantity of the oxidizer HTH was mixed with mineral oil and saturated with a thin section of porous substrate which advantageously may be comprised of polyethylene. The polyethylene substrate was then bonded to the surface of the thin film sensor element 40. However, the method of application described was used for this laboratory-prototype device. Other means such as thin film technology may have applications as well.

Microliter quantities of an agent simulant Diethylmalonate, hereinafter referred to as (DEM) and Malathion were dropped on the surface. The sensor responded, successfully, within seconds. Tests were conducted wherein the sensor was also challenged with interferents and desirably did not respond or showed little response.

The advantageous side effect of this detection methodology is that the chemical reaction between the agent and the HTH also decontaminates or neutralizes the agent. It is understood that the polyethylene substrate used here, could be replaced by any media that could contain or retain the oxidizing media.

While a preferred embodiment of the method and device for use in carrying out the method has been disclosed it is to be understood that other modifications and variations of the invention are intended to be protected to the full extent as determined by the appended claims.

What is claimed is:

1. A device for detecting presence of chemical agents, said agents comprising of organic phosphate materials contacting said device, the device comprising:

a base means made of an electrically and thermally insulative material, said base means having an electrode having a defined dimension of height and an upper surface;

an electrode made of a layer of platinum material deposited on the upper surface of said base means; the thickness of said layer being relatively small compared to the height of said base means;

a porous material, embedded with an oxidizing agent, said material vapor deposited over the upper surface of said base means, covering over said electrode;

means for causing a constant current of approximately 4 milliamps direct current to flow through said electrode when the device is in use;

means for constantly measuring the voltage that appears across said electrode, such voltage occurring because of said current flowing in said electrode;

whereby when liquid droplets of organic phosphate chemical agents are deposited onto said porous material, they react with said oxidizing agent causing heat release, whereupon a heating of said electrode occurs within one second which heating leads to a current fluctuation in said electrode, such current fluctuation causes a change in the voltage being measured across the electrode whereupon such voltage change is indicative that such deposited droplets had been chemical agents comprising organic phosphate materials.

2. The device as in claim 1 whereby said base means is made of pyrex material.

3. The device as in claim 2 whereby said porous material comprises a polyethelene substrate.

4. The device as in claim 1 whereby the oxidizing agent is calcium hypochlorite.

* * * * *